(12) United States Patent
Sugiyama

(10) Patent No.: US 8,773,329 B2
(45) Date of Patent: Jul. 8, 2014

(54) HEAD-UP DISPLAY DEVICE

(75) Inventor: Takashi Sugiyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 936 days.

(21) Appl. No.: 12/892,591

(22) Filed: Sep. 28, 2010

(65) Prior Publication Data

US 2011/0074657 A1    Mar. 31, 2011

(30) Foreign Application Priority Data

Sep. 28, 2009    (JP) ................... 2009-222342

(51) Int. Cl.
*G09G 5/00* (2006.01)
(52) U.S. Cl.
USPC .................................. 345/7; 345/8; 359/630
(58) Field of Classification Search
USPC .............. 345/7–9, 1.1, 1.2, 1.3, 2.1, 2.2
See application file for complete search history.

(56) References Cited

U.S. PATENT DOCUMENTS

| | | | | |
|---|---|---|---|---|
| 6,580,562 | B2 * | 6/2003 | Aoki et al. | 359/630 |
| 2009/0034087 | A1 * | 2/2009 | Hung et al. | 359/630 |
| 2009/0160736 | A1 * | 6/2009 | Shikita | 345/7 |

FOREIGN PATENT DOCUMENTS

| | | | |
|---|---|---|---|
| JP | 63-124020 | A | 5/1988 |
| JP | 09-15555 | A | 1/1997 |
| JP | 9-506717 | A | 6/1997 |
| JP | 9-292587 | A | 11/1997 |
| JP | 2008-268485 | A | 11/2008 |
| WO | 95/16935 | A1 | 6/1995 |
| WO | 2007/116639 | A1 | 10/2007 |

OTHER PUBLICATIONS

Japanese Office Action for the related Japanese Patent Application No. 2009-222342 dated Feb. 5, 2013.

* cited by examiner

*Primary Examiner* — Duc Dinh
(74) *Attorney, Agent, or Firm* — Kenealy Vaidya LLP

(57) ABSTRACT

A head-up display device placed on an upper surface of a dashboard, includes: an object of view arranged in an inside space of the dashboard; an imaging optical system of real specular image for defining a space where a viewer exists and the inside space of the dashboard, the imaging optical system of real specular image including a semitransparent substrate with a plane of symmetry, the imaging optical system of real specular image forming a real image of the object of view in the space of the viewer with light passing through the substrate; and a reflective screen arranged in the space of the viewer, the reflective screen reflecting light beams of the real image of the object of view supplied from the imaging optical system of real specular image to guide the reflected light beams to the viewer, while allowing formation of an image to be seen by the viewer.

17 Claims, 11 Drawing Sheets

Fig. 2
(a)
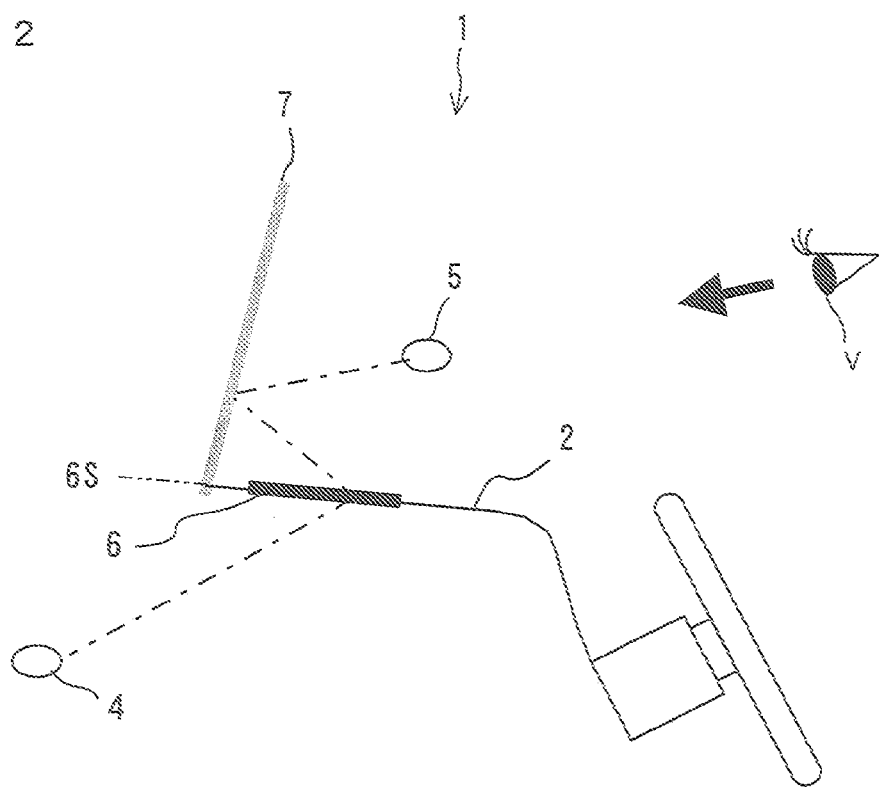
(b)
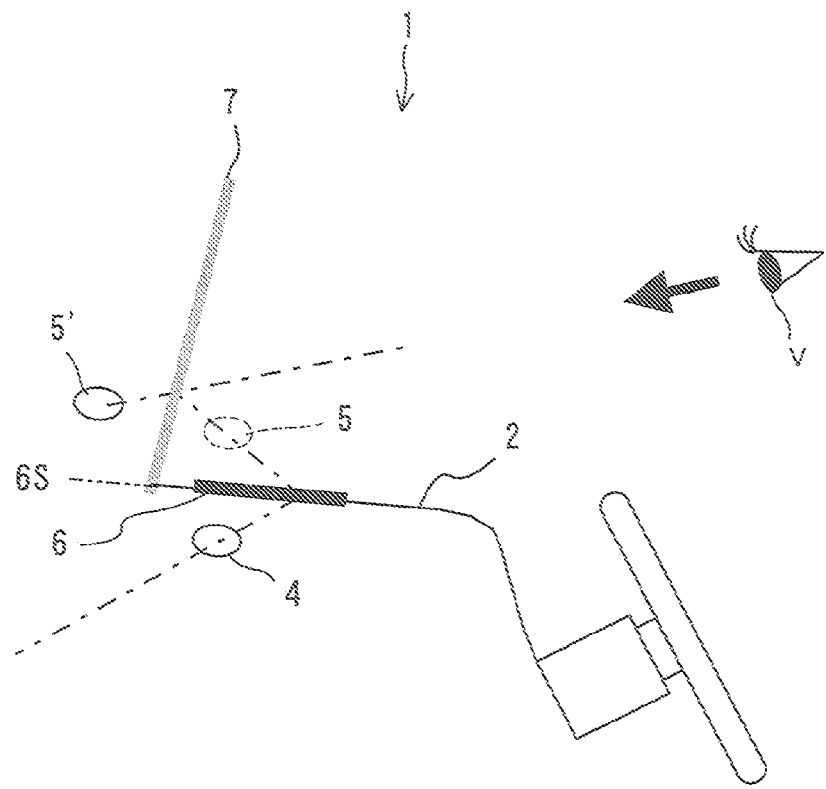

HEAD-UP DISPLAY DEVICE

This application claims the priority benefit under 35 U.S.C. §119 of Japanese Patent Application No. 2009-222342 filed on Sep. 28, 2009, which is hereby incorporated in its entirety by reference.

BACKGROUND OF THE INVENTION

1. Field of the Invention

The present invention relates to a display device as means for displaying information to a driver in a vehicle, and particular to a head-up display device.

2. Description of the Related Art

In a vehicle such as a automobile, a driver is given instrument information of various kinds of displays such as speed, the number of revolutions of an engine, etc., via a speedometer, a revolution-counter, etc., for example, in a so-called meter cluster (instrument panel) installed on a dashboard. Presently there can be used a head-up display device to display such information on a windshield over the dashboard (for example, Japanese Patent Application Laid-Open Publication No. 09-15555).

A driver sees a virtual image of a displayed image reflected a windshield in a head-up display device described in the Publication No. 09-15555. Therefore the driver perceives the displayed image in a space of the opposite side of the driver with respect to the windshield, i.e., the outside of a vehicle.

A position of a displayed image to be seen depends on a distance between an object of view and a windshield and a radius of curvature of a mirror surface positioned therebetween, in general. Anyway the driver sees a displayed image in the outside of the vehicle (the outside the windshield), by no means, the driver cannot perceives the displayed image in the inside of a vehicle (the inside of the windshield).

As described above, it is impossible to give the driver any images displayed in a both the spaces of the outside (the outside of a vehicle) and the inside (the inside of a vehicle) of the windshield even using a conventional head-up display device utilizing a virtual image.

SUMMARY OF THE INVENTION

In view of the above-mentioned problems, an object of the present invention is to provide a head-up display device capable of displaying an impressive image while freely setting a position of the displayed image (distance perception) with respect to a windshield.

There is provided a head-up display device placed on an upper surface of a dashboard according to the present invention is characterized by including: an object of view arranged in an inside space of the dashboard; an imaging optical system of real specular image for defining a space where a viewer exists and the inside space of the dashboard, the imaging optical system of real specular image including a semitransparent substrate with a plane of symmetry, the imaging optical system of real specular image forming a real image of the object of view in the space of the viewer with light passing through the substrate; and a reflective screen arranged in the space of the viewer, the reflective screen reflecting light beams of the real image of the object of view supplied from the imaging optical system of real specular image to guide the reflected light beams to the viewer, while allowing formation of an image to be seen by the viewer.

The present invention realizes, for example, a head-up display device enabling to display an image to be seen by the viewer in a both the spaces of the outside (the outside of a vehicle) and the inside (the inside of a vehicle) of a windshield. Specifically, such realization is done by a head-up display device including an imaging optical system of real specular image positioned on an upper surface of a dashboard of a vehicle for forming a real image of an object of view (real specular image) in the space of the viewer; the object of view for the real image (real specular image) positioned in a space of the opposite side of an imaging optical system of real specular image of the viewer; and a reflective screen arranged in the same space of the viewer to reflect partially light supplied from the imaging optical system of real specular image to guide the reflected light to the viewer.

The present invention is embodied as a head-up display device in that a windshield serves as the reflective screen and alternatively the reflective screen is formed on a surface of a windshield.

The present invention is also embodied in that the reflective screen is adhered to a surface of a windshield.

If the distance between an object of view and an imaging optical system of real specular image is shorter than the distance between the reflective screen (windshield) and an imaging optical system of real specular image, then the driver sees an image of an object of view as a virtual image at the outside (outside of a vehicle) of the reflective screen (windshield). In contrast, if the distance between an object of view and an imaging optical system of real specular image is longer than the distance between the reflective screen (windshield) and an imaging optical system of real specular image, then the driver sees an image of an object of view as a real image at the inside (the outside of a vehicle) of the reflective screen (windshield). Therefore, the head-up display device may further comprise means for changing a position of the object of view with respect to the imaging optical system of real specular image. The head-up display device may further comprises means for moving the object of view along a line connecting the object of view and the imaging optical system of real specular image.

In other words, in dependence on the distance between an object of view and an imaging optical system of real specular image, the driver perceives visually a position of an image of an object of view in the inside or outside of the vehicle with respect to the reflective screen (e.g., windshield) and alternatively on the windshield (as an image of the object of view sticking therethrough). Therefore, in the head-up display device, a position of the object of view is changed in such a manner that there are at least two situations selected from situations consists of where the image to be seen is arranged to cross the reflective screen, where the image to be seen is a virtual image in the reflective screen, and where the image to be seen is a real image out of the reflective screen. It is preferable that the object of view is used selectively in such a manner that plural objects of view are positioned at plural positions in order to control the distance between the object of view and the imaging optical system of real specular image.

There is another way to control the distance between the object of view and the imaging optical system of real specular image, that is, means for moving the object of view along a line connecting the object of view and the imaging optical system of real specular image. In this case, the moving distance an object of view is set up within an range that the viewer (driver) can see both the images of an real image formed by the imaging optical system of real specular image and the reflective screen and a virtual image formed by the reflective screen on the basis of the real image formed by imaging optical system of real specular image.

It is preferable in the head-up display device that the substrate of the imaging optical system of real specular image is formed to be a united body with the dashboard. It is also preferable in the head-up display device that a surface of the substrate is colored with a same color of the dashboard.

In order to suitably bend each light beam by each of the dihedral corner reflectors and allows the light beam to pass through the element surface, inner walls of optical holes defined in a direction in which the holes penetrate the element surface are used as respective mirror surfaces of the dihedral corner reflectors of the dihedral corner reflector array. These dihedral corner reflectors are described conceptually, and are not required to reflect a shape determined, for example, by physical boundaries. As an example, the optical holes may not be separated, but may be coupled to each other.

In simple terms, the dihedral corner reflector array is constructed of a large number of mirror surfaces substantially orthogonal to the element surface and arranged on the element surface. What should be taken into account in terms of structure is how the mirror surfaces are fixedly supported on the element surface. As an exemplary specific way of forming the mirror surfaces, a substrate for defining predetermined spaces is provided to have a plane in which the dihedral corner reflector array is arranged as an element surface and then inner walls of each optical hole are used as mirror surfaces of each of the dihedral corner reflectors where the optical holes are made so as to penetrate the element surface. The holes formed in the substrate are only required to be transparent for allowing respective light beams to pass therethrough. By way of example, the holes may be evacuated. Or, the holes may be filled with transparent gas or transparent liquid. The shape of each hole may arbitrarily be determined, as long as the holes each have one mirror surface on its inner wall functioning as a unit optical element, or two or more of such mirror surfaces not existing on the same plane, and each light beam reflected by the mirror surface is allowed to pass through the corresponding hole. The holes may be coupled, or may be of complicated structures as a result of their partial losses. As another example, different independent mirror surfaces stand together in large numbers on a surface of a substrate. In this case, it is understood that holes formed in the substrate are coupled to each other.

Further, the dihedral corner reflectors may be formed using a solid substance such as transparent glass or resin to have a prism or cylindrical shape as the optical hole. In the case where each cylindrical member is formed from a solid substance, the cylindrical members may be arranged close to each other to function as a support member of the elements. Also, if the dihedral corner reflector array has a substrate, the cylindrical members may project from a surface of the substrate. The shape of the cylindrical members may also arbitrarily be determined, as long as the cylindrical members each have one mirror surface on its inner wall, or two or more of such mirror surfaces not existing on the same plane that allow the cylindrical member to function as a dihedral corner reflector, and each light beam reflected by the mirror surface is allowed to pass therethrough. Although called cylindrical members, they may be coupled, or may be of a complicated structure as a result of their partial losses.

A shape of the optical hole should be considered, wherein all of the adjacent inner wall surfaces are orthogonal, as in a cube or a rectangular parallelepiped. In such a case, the gaps between adjacent dihedral corner reflectors can be minimized, and thereby highly dense arrangements are possible. It is preferable that reflection be prevented by a surface other than that of a dihedral corner reflector that faces an object of view.

In the case where a dihedral corner reflector has a plurality of inner mirror surfaces, some of the transmitted light may undergo multiple reflections, i.e., there may occur multiple reflections of light beams passing through the hole several times or more than that of assumed reflections. Regarding countermeasures for these multiple reflections, if two mutually orthogonal mirror surfaces are formed on the inner wall of an optical hole, such multiple reflections is prevented in the following ways. In one way, a surface other than these two mirror surfaces may be made non-specular to prevent reflection of light beams by this surface. In another way, a surface other than these mirror surfaces may be tilted from an element surface so that it may not orthogonal to the element surface, or may be curved. In either way, generation of the multiply reflected light beam reflected three times or more may be reduced, or prevented. In order to form a non-specular surface, the following configuration may be used in which a target surface may be coated with an anti-reflection coating or a thin film and, alternatively, the surface roughness of the target surface may be increased to cause diffuse reflection on the target surface. In addition, the existence of a transparent and flat substrate does not obstruct the functions of the optical element, and therefore any appropriate substrate may be used as a supporting member and/or a protective member.

In order to enhance the brightness level of a real image to be projected, it is desirable that a number of dihedral corner reflectors arranged on an element surface are as close as possible to each other. As an example, lattice arrangement of the dihedral corner reflectors is effective. Such an arrangement makes it easy to manufacture a display device, as a merit. A mirror surface of each dihedral corner reflector may be a flat surface for causing reflection of light beams, and which is made of a lustrous substance such as metal or resin, regardless of whether the substance is solid or liquid. A mirror surface of a dihedral corner reflector may also be such that it causes reflection or total reflection at a flat boundary interface between transparent media of different refractive indexes. In the case where a total internal reflection is used for the mirror surface, it is highly likely that the undesirable multiple reflections by the plurality of multiple mirror surfaces will exceed the critical angle of the total internal reflection, and therefore it is expected that these undesirable multiple reflections will naturally be suppressed. Additionally, the mirror surface may either be formed only on a limited part of the inner wall of an optical hole, or may be constructed of a plurality of unit mirror surfaces arranged in parallel, as long as each mirror surface serves its function without problems. Regarding the latter aspect, in other words, the formation of a mirror surface from unit mirror surfaces means that a mirror surface may be divided into a plurality of unit mirror surfaces. In this case, the unit mirror surfaces are not necessarily required to exist on the same plane, but are parallel. Furthermore, the unit mirror surfaces may be contact with each other, or may be spaced from each other.

Another specific example applicable in the present invention as an imaging optical system of real specular image is an optical system including a retroreflector array for causing retroreflection of light beams, and a half mirror with a half mirror surface for reflecting light beams and causing the light beams to pass therethrough. In this imaging optical system of real specular image, the half mirror surface functions as a plane of symmetry, and the retroreflector array is arranged at a position that can cause retroreflection of light beams emitted from an object of view, and reflected by or passing through the half mirror. The retroreflector array is arranged only in the same space in which an object of view also exists with respect to the half mirror. The position of the retroreflector array is such that light beams reflected by the half mirror are retro-reflected by the retroreflector array. Herein "Retroreflection", that is the operation of a retroreflector, is a phenomenon in which each reflected light beam is reflected back to where it originated (or reversely reflected), thus the incoming light beam and the reflected light beam are parallel to each other and in opposite directions. A number of retroreflectors are arrayed to constitute the retroreflector array. If each of the retroreflectors is sufficiently small in size, paths of an incoming light beam and a reflected light beam are considered to overlap. The retroreflectors of the retroreflector array are not required to be on a plane surface, but may be on a curved surface. Furthermore, these retroreflectors are not required to be on the same plane, but may be scattered three-dimensionally. In addition, the half mirror has two functions to cause light beams to pass therethrough and to reflect light beams. A ratio between the transmittance and the reflectivity of the half mirror is ideally 1:1.

There may be utilized a retroreflector constructed of three adjacent mirror surfaces (called a "corner reflector" in a broad sense). Alternatively, a cat's eye retroreflector may be used as the retroreflector. As an example, a corner reflector is constructed of three mirror surfaces orthogonal to each other. As another example, the corner reflector has three adjacent mirror surfaces, where two of angles defined by the mirror surfaces are both 90 degrees, and the other angle is 90/N (where N is an integer) degrees. As still another example, the corner reflector is also an acute angle retroreflector with three mirror surfaces, where angles defined by three mirror surfaces are 90 degrees, 60 degrees and 45 degrees respectively.

If the imaging optical system of real specular image including the aforementioned retroreflector array and the half mirror is used, some light beams emitted from an object of view are reflected by the half mirror surface. Then, the reflected light is retro-reflected by the retroreflector array to return to where it originated in all cases, and then passes through the half mirror surface. As a result, an image of the object is formed. Accordingly, as long as the retroreflector array is placed at a position that allows receipt of reflected light beams from the half mirror, the shape and the position of the retroreflector array are not limited. A real image thereby formed is seen in a direction opposite to light beams passing through the half mirror surface.

An example of an object of view is an indication fixedly displayed such as a neon sign, or that fixedly displayed on a display panel (such as an emergency lamp constructed of a light source and a display panel). Another example of an object of view is an image displayed on a display surface of an electronic display such as a liquid crystal display, a CRT display and an organic EL display. Still another example of an object of view is an array light source given by arranging compact light sources such as LEDs in line and controlling a place of light emission.

According to the present invention, there is realized a head-up display device capable of displaying an impressive image while freely setting a position of the displayed image (distance perception) with respect to a windshield.

BRIEF DESCRIPTION OF THE DRAWINGS

The aforementioned aspects and other features of the present invention are explained in the following description, taken in connection with the accompanying drawing figures wherein:

FIG. 2 is a schematic cross-sectional side view illustrating a principal part of the head-up display device of the embodiment when viewed from a side;

DETAILED DESCRIPTION OF THE INVENTION

Figure 1:
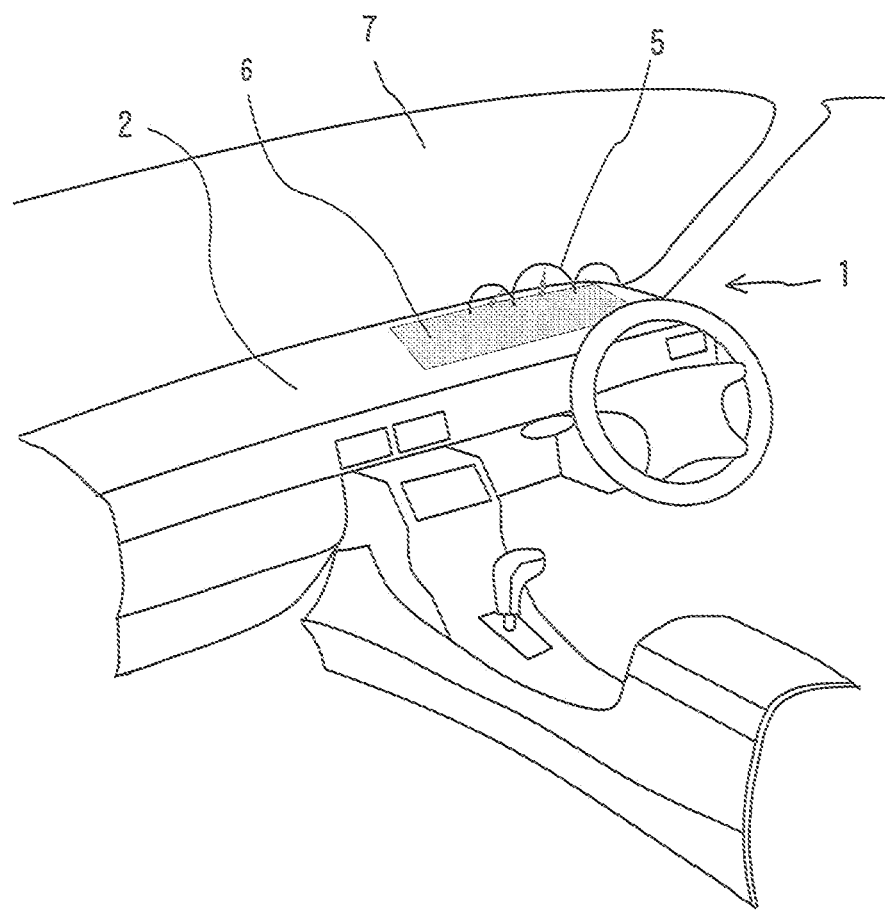
FIG. 1 is a schematic perspective view illustrating a part of interior components of a vehicle to which adapted with a head-up display device of an embodiment of the present invention.

A head-up display device of an embodiment according to the present invention will be described herein below by referring to the drawings.

Figure 3:
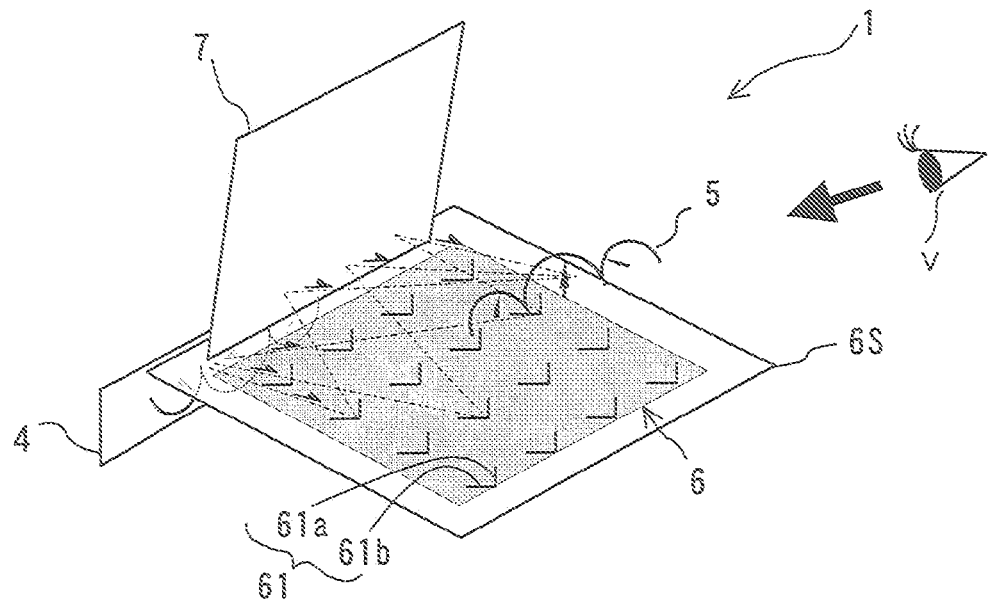
FIG. 3 is a schematic perspective view illustrating a principal part of the head-up display device of the embodiment when viewed from the viewer.

FIG. 1 is a schematic perspective view illustrating a dashboard of a vehicle such as an automobile and its surroundings including a head-up display device 1 of the embodiment of the present invention. FIGS. 2 and 3 are schematic sectional and perspective views respectively that explain the operation of the head-up display device 1.

The head-up display device 1 is made by applying the present invention to an upper portion of a dashboard 2 (including an upper space thereof, the viewer side) in the front of a driver's seat of an automobile, using a windshield 7 for a reflective screen. Specifically, the head-up display device 1 has a dihedral corner reflector array 6 as an imaging optical system of real specular image united to an upper portion of the dashboard 2, and provided with an object 4 of view arranged in a space of the dashboard 2 (a lower space thereof, an object to be seen). In FIG. 2(a), light beams emitted form the object 4 are reflected by the dihedral corner reflector array 6, and then are reflected by the windshield 7 to form a floating image 5 as a real specular image 5 in the front of the windshield 7. In other words, a driver of the viewer can see the floating image 5 a space short of windshield 7.

FIG. 2(b) shows a situation that the viewer can see a floating image 5 behind the windshield 7, i.e., in a space of the outside of a vehicle. The situations shown in FIGS. 2(a) and 2(b) differ in the distance between the dihedral corner reflector array 6 and the object 4. The situation shown in FIG. 2(b) has such a distance shorter than that of FIG. 2(a). If the distance between the dihedral corner reflector array 6 and the object 4 is shorter than that of between the dihedral corner reflector array 6 and the windshield 7, then the real specular image 5 of the object of view is formed in a space of the inner side of the windshield 7, but the viewer cannot directly see the real specular image 5 and the viewer indirectly perceives a virtual image projected by the windshield 7 like a floating image 5' of a virtual image in a space of the outside the windshield 7.

As shown in FIG. 3, if a head-up display device has a long distance between a dihedral corner reflector array 6 and an object 4, for example, a liquid crystal display device, then a picture object of a speedometer exhibited in the screen of the liquid crystal display device is projected as an image of the picture object 5 in a space over a dashboard 2 wherein the exhibited picture is previously set upside down (FIG. 2(a)).

As shown in FIG. 1 through FIG. 3, the head-up display device 1 of the present invention includes the dihedral corner reflector array 6 as an imaging optical system of real specular image; and the object 4 positioned in a space of the opposite side of the viewer V with respect to the dihedral corner reflector array 6 (the inside of the dashboard 2). The display device further includes the windshield 7 arranged in the space where the viewer V exists with respect to the dihedral corner reflector array 6. Each light beam emitted from the object 4 passes through the dihedral corner reflector array 6 after being reflected twice by the dihedral corner reflector thereof, and is reflected further by the dihedral corner reflector array 6 and then is reflected further by the windshield 7, so that the floating image 5 as a real specular image is formed within the sightline of the viewer V (FIG. 2(a)). In addition, the windshield 7 is set to have a pertinent tilt angle with respect to the dihedral corner reflector array 6 in order to guide the passing light beams to the viewer V. In other words, the object 4, the dihedral corner reflector array 6 and the windshield 7 are arranged such that the light beam emitted from the object 4 is reflected by the dihedral corner reflector array 6, and is then caused to travel to the windshield 7.

In order to explain the aforementioned relationship in detail, the structure and the operation only of the dihedral corner reflector array 6 are described first. An operation realized by adding the reflective screen is described next.

Figure 4:
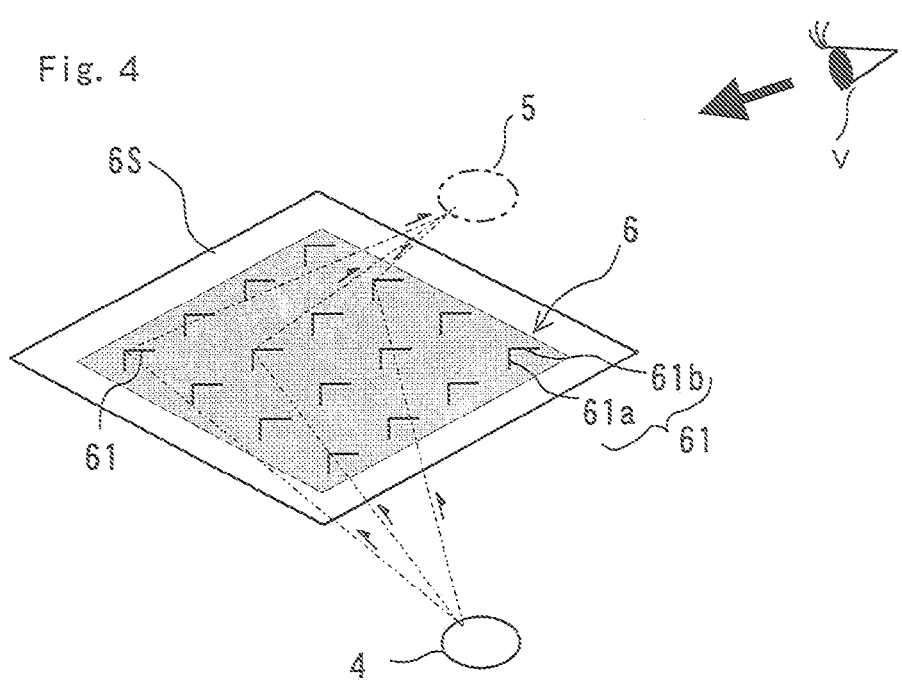
FIG. 4 is a schematic perspective view illustrating how an image is formed only by a dihedral corner reflector array applied to the embodiment.
Figure 5A:
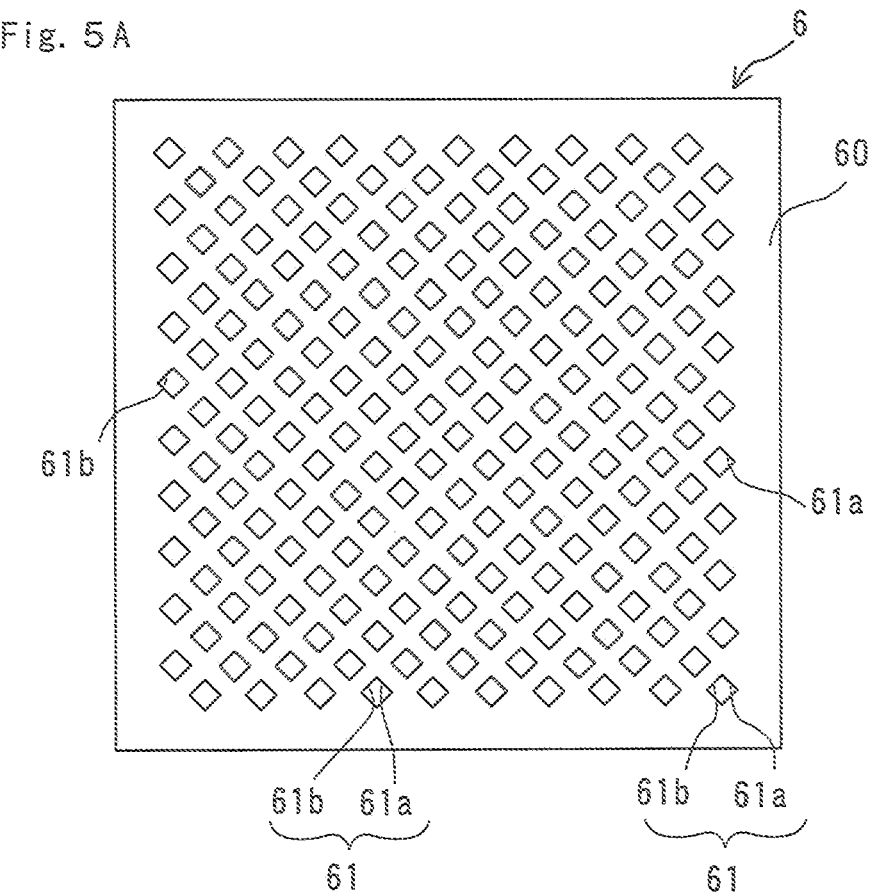
FIGS. 5A and 5B are a schematic plan view and a partial cutaway perspective view respectively illustrating a specific example of the structure of the dihedral corner reflector array applied to the head-up display device of the embodiment.
Figure 5B:
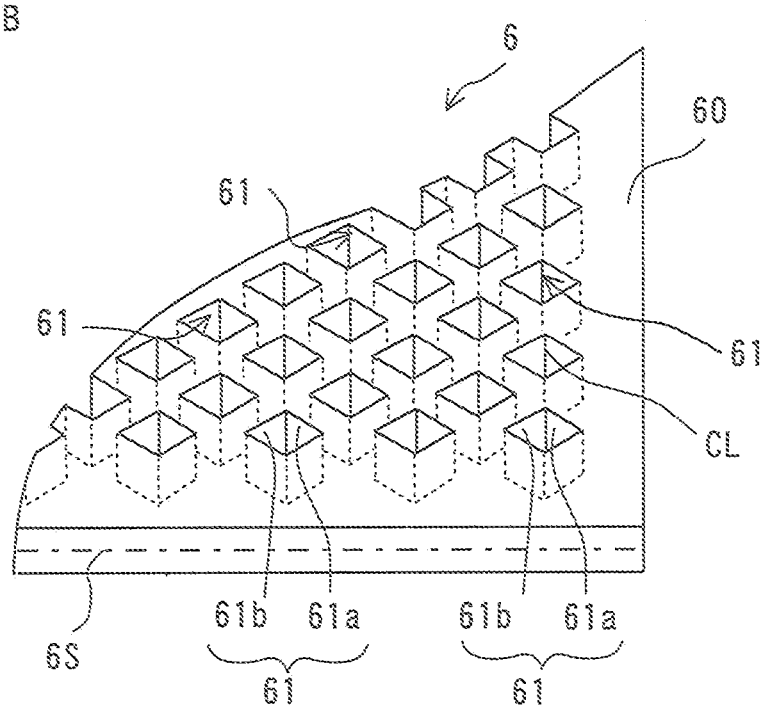

As is schematically shown in FIG. 4, the dihedral corner reflector array 6 is constructed of a large number of dihedral corner reflectors 61 each having two orthogonal mirror surfaces 61a and 61b. A flat surface substantially orthogonal to the two mirror surfaces 61a and 61b of each of the dihedral corner reflectors 61 is defined as an element surface 6S. The real image 5 of the object 4 is formed at a position plane-symmetrical to the object 4 with respect to the element surface 6S. In the present embodiment, the dihedral corner reflectors 61 are considerably small (on the order of micrometers) compared to the entire size (on the order of centimeters) of the dihedral corner reflector array 6. In FIG. 4, an aggregate of the dihedral corner reflectors 61 is shown in gray and a dihedral angle defined by the mirror surfaces are indicated by V shapes as showing an orientation of the interior corners thereof, so that the dihedral corner reflectors 61 are exaggeratedly shown in the figure. FIG. 5A is a schematic plan view of the dihedral corner reflector array 6, and FIG. 5B is a perspective view of part of the dihedral corner reflector array 6. In FIGS. 5A and 5B, the dihedral corner reflectors 61 and the mirror surfaces 61a, 61b are shown to be quite exaggerated in comparison to the entirety of the dihedral corner reflector array 6.

For the dihedral corner reflector array 6 to bend each light beam and allow the light beam to pass therethrough, a following optical element may be used, in which a large number of physical and optical holes are formed in the flat surface of a flat plate substrate 60 in such a manner that the holes vertically penetrate the substrate 60 in the thickness direction wherein two orthogonal ones of the inner wall surfaces of every hole is formed as mirror surfaces 61a and 61b in order to use the inner wall surfaces of each hole to function as the dihedral corner reflector 61. To provide the substrate 60 at least with a semi-transmitting property, as shown in FIGS. 5A and 5B, a large number of physical and optical holes (one side of which ranges from 50 μm to 200 μm, for example) substantially rectangular (square, for example) in plan view for allowing each light beam to pass therethrough are formed in the thin flat plate substrate 60. Then, the mirror surfaces 61a and 61b are formed by smoothing and mirror finishing of two orthogonal and adjacent ones of the inner wall surfaces of each hole. As a result, the dihedral corner reflectors 61 each have the two mirror surfaces 61a and 61b functioning as reflective surfaces are provided. It is preferable that some of the inner wall surfaces of the holes that are not to form the dihedral corner reflectors 61 be subjected to no mirror finishing so that they will be made non-reflective, or be angled so that they will produce no multiply reflected light beams. It is also preferable that the dihedral corner reflectors 61 be arranged on regularly aligned lattice points so that the internal angles defined by the mirror surfaces 61a and 61b will be all positioned in the same direction on the substrate 60. Accordingly, a line of intersection CL of the two orthogonal mirror surfaces 61a and 61b of each of the dihedral corner reflectors 61 is preferably orthogonal to the element surface 6S. In the below, the direction of the internal angle defined by the mirror surfaces 61a and 61b is called the orientation (direction) of the dihedral corner reflector 61.

Exemplary formation of the mirror surfaces 61a and 61b is as follows. A metallic mold is prepared first. Then, a process such as a nanoscale cutting process, a nanoimprint process that is a nanoscale press process using a mold, or electroforming is performed on the inner wall surfaces so that the inner wall surfaces function as the mirror surfaces 61a and 61b. The mirror surfaces 61a and 61b thereby formed are processed such that their surface roughness is equal to, or less than, 10 nm, and that they uniformly function as mirror surfaces in a visible light spectral range. When the substrate 60 is formed by electroforming with metal such as aluminum or nickel, the mirror surfaces 61a and 61b become natural mirror surfaces if the surface roughness of the mold is sufficiently small. When a nanoimprint process is used to apply resin and the like as a material of the substrate 60, mirror coating should be performed by a process such as sputtering to form the mirror surfaces 61a and 61b. Transmittance of light is enhanced by controlling a space between adjacent ones of the dihedral corner reflectors 61 to its minimum possible level. It is preferable that the upper surface (surface viewed from a viewer)

of the dihedral corner reflector array 6 be subjected to a process such as coating with a low reflective material. The structure of the dihedral corner reflector array 6 is not limited to those described above. The structure of the dihedral corner reflector array 6 and a method of forming the same may suitably be employed, as long as a large number of dihedral corner reflectors 61 are each formed by the two orthogonal mirror surfaces 61a and 61b, and the dihedral corner reflectors 61 each function as an optical hole for allowing each light beam to pass therethrough.

In each of the dihedral corner reflectors 61 constituting the dihedral corner reflector array 6, light beams entering the corresponding hole via the rear side are reflected by one mirror surface 61a (or 61b). The reflected light beam is further reflected by the other mirror surface 61b (or 61a), and is then caused to pass through the dihedral corner reflector 61 via the front side. A path along which each light beam enters the dihedral corner reflector 61 and a path along which the light beam exits the dihedral corner reflector 61 are planesymmetrical to each other with respect to the element surface 6S. Specifically, assuming that the element surface 6S is a surface passing the central portion of the height of each mirror surface and orthogonal to each mirror surface, the element surface 6S is a plane of symmetry with respect to which the position of the real image formed as a floating image, i.e., real specular image 5 of the object 4 is plane-symmetrical to the object 4.

Briefly described next together with a path of each light beam emitted from a point light source (o) as an object of view is how an image is formed by the dihedral corner reflector array 6.

Figure 6:
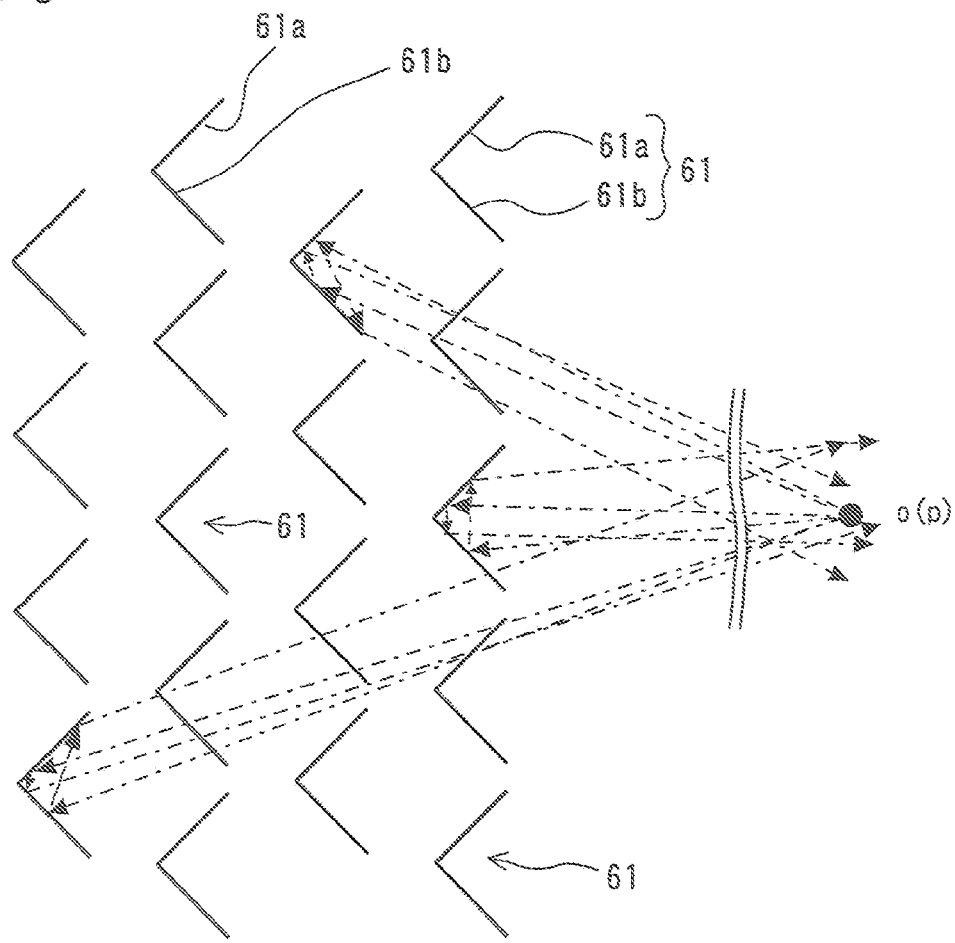
FIG. 6 is a schematic plan view illustrating how an image is formed by the dihedral corner reflector array applied to the head-up display device of the embodiment.
Figure 7:
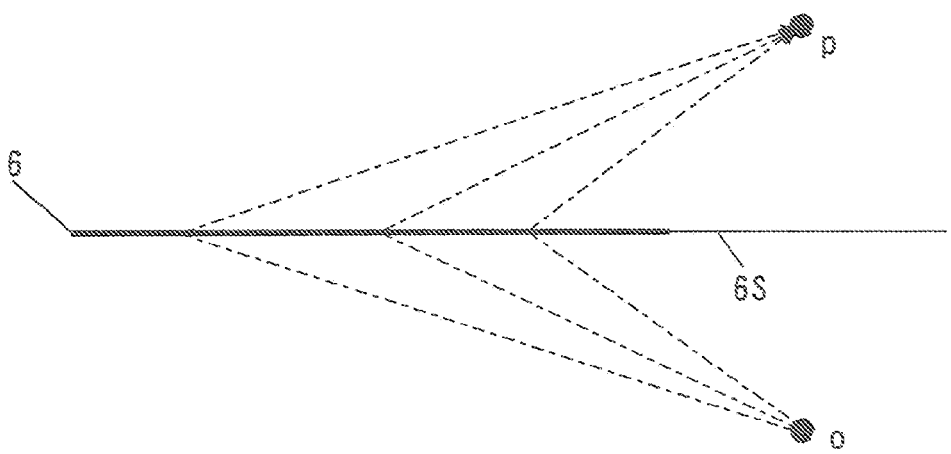
FIG. 7 is a schematic side view illustrating how an image is formed by the dihedral corner reflector array applied to the head-up display device of the embodiment.

As is schematically shown in the plan view of FIG. 6 and in the side view of FIG. 7, when passing through the dihedral corner reflector array 6, light beams emitted from the point light source (o) (indicated by one-dot arrowed chain lines traveling from the back toward the front on the drawing when viewed three-dimensionally in FIG. 6) are each reflected once by one mirror surface 61a (or 61b), and is reflected further by the other mirror surface 61b (or 61a) of each of the dihedral corner reflectors 61. Next, the reflected light beams pass through the element surface 6S (FIGS. 7, 4 and 5B), and then pass in dispersion a point that is plane-symmetrical to the point light source (o) with respect to the element surface 6S of the dihedral corner reflector array 6. Incoming light beams and reflected light beams are shown to be parallel in FIG. 6. The reason therefor is as follows. In FIG. 6, the dihedral corner reflectors 61 are shown to be exaggeratedly large in comparison to the point light source (o). However, the actual size of the dihedral corner reflectors 61 is considerably small. Accordingly, incoming light beams and reflected light beams nearly overlap each other when the dihedral corner reflector array 6 is viewed from above. (In FIG. 6, paths of light beams that first fall on both of the two mirror surfaces (61a, 61), namely, two paths, of each of the dihedral corner reflectors 61 are shown. In FIG. 7, only one light beam that first falls on either of the mirror surfaces is shown in order to avoid complication.) In summary, light beams converge to a position plane-symmetrical to the point light source (o) with respect to the element surface 6S, so that a real image is formed at a position (p) shown in FIGS. 6 and 7.

Figure 8:
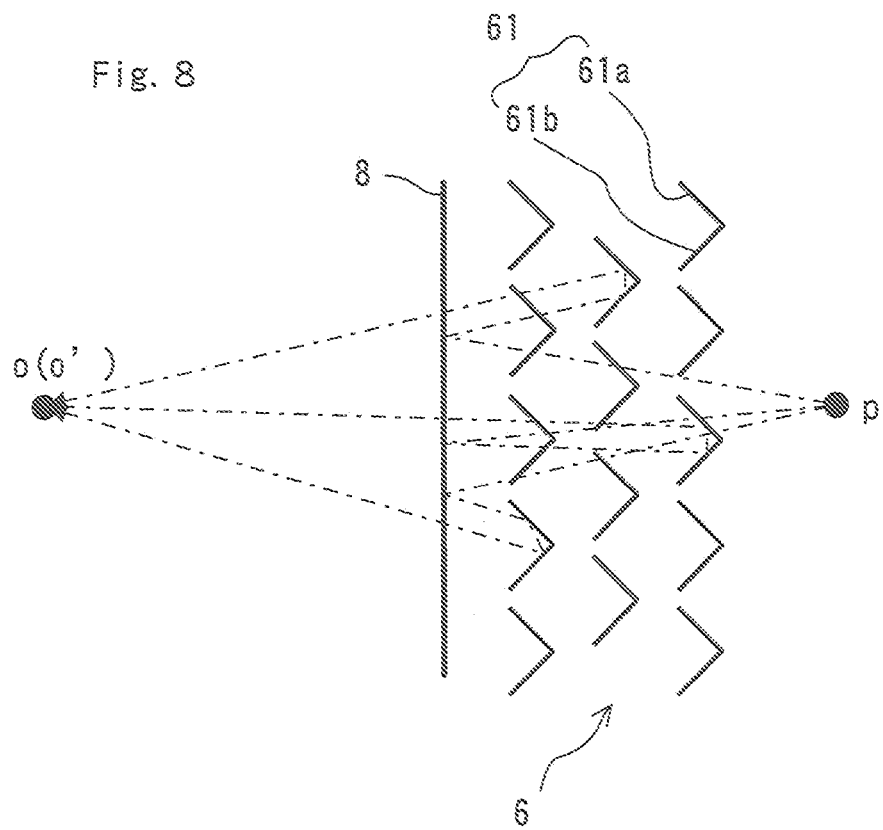
FIG. 8 is a schematic plan view illustrating how an image is formed by combination of a half mirror with the dihedral corner reflector array applied to the head-up display device of the embodiment.
Figure 9:
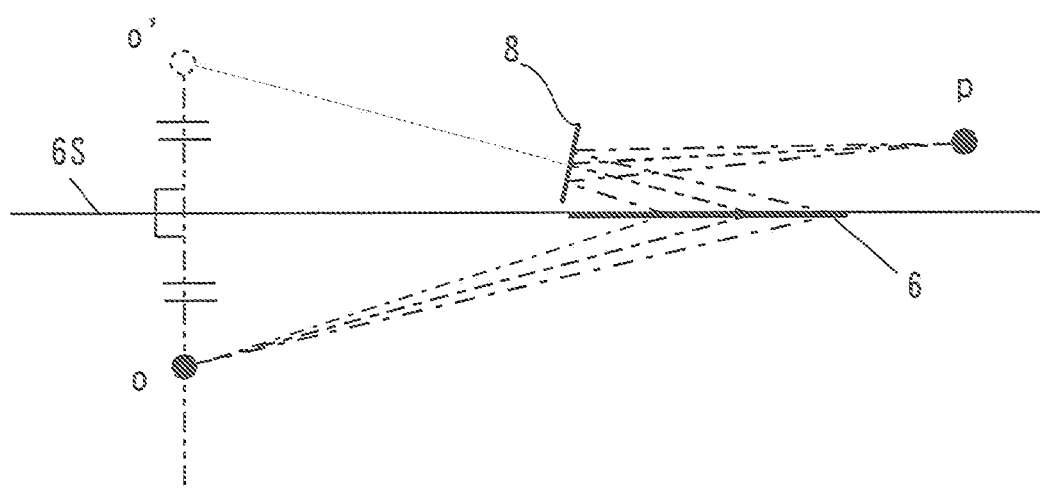
FIG. 9 is a schematic side view illustrating how an image is formed by combination of the half mirror with the dihedral corner reflector array applied to the head-up display device of the embodiment.

FIGS. 8 and 9 respectively corresponding to FIGS. 6 and 7 explain the operation realized by adding the reflective screen 8 in the space in which the viewer exists. Although FIG. 6 shows paths of light beams that first fall on both of the two mirror surfaces (61a, 61b) of each of the dihedral corner reflectors 61 are shown (namely, two paths are shown), but in FIG. 8, only one light beam that first falls on either of the mirror surfaces is shown in order to avoid complication. A basic concept is as follows. Each light beam emitted from the point light source (o) first passes through one of the dihedral corner reflectors 61 after being reflected twice at the dihedral corner reflector 61. The reflected light beam is then caused to turn back by the planar reflective screen 8 arranged on the path of the light beam traveling toward the viewer V. As a result, a real image is formed at the position (p). Specifically, a relationship between a real image at the position (p) shown in FIGS. 6 and 7 and a real image at the position (p) shown in FIGS. 8 and 9 is the same as a relationship between an object (corresponding to the real image at the position (p) shown in FIGS. 8 and 9) and a virtual image (formed at a position (o') shown in FIGS. 8 and 9 and corresponding to the real image at the position (p) shown in FIGS. 6 and 7) when the reflective screen 8 is viewed from the side of the dihedral corner reflector array 6. The location (angle) of the reflective screen 8 shown in FIG. 8 is set so that the viewer can see the real specular image of the position (p). If the windshield 7 is used for the reflective screen 8 instead, then a tilt angle of the windshield 7 is not freely set. Therefore, by adjusting a positional relationship of the dihedral corner reflector array 6 and the object 4 so that the viewer can see the real specular image of the position (p).

Further, there is described the effect of variations of the distance between the dihedral corner reflector array 6 and the object 4.

Figure 10:
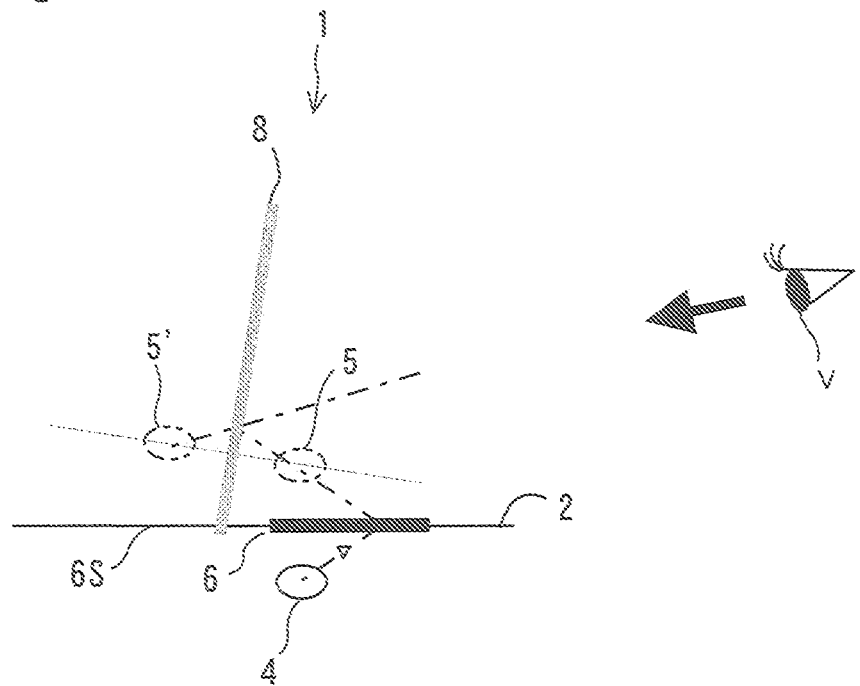
FIGS. 10 to 12 are schematic cross-sectional side views illustrating principal parts of head-up display devices of respective other embodiments according to the present invention when viewed from a side.

FIG. 10 explains the case the distance between the dihedral corner reflector array 6 and the object 4 is shorter than that of between the dihedral corner reflector array 6 and the reflective screen 8. In this case, the real specular image 5 is formed in a space of between the dihedral corner reflector array 6 and the reflective screen 8, so that the viewer can see a real specular image as a virtual image 5' caused by reflection the reflective screen 8.

As shown in FIG. 10, each light beam emitted from the object 4 passes through the dihedral corner reflector array 6 after being reflected twice by the dihedral corner reflector array 6. Then, a real image of the object 4 is formed as the floating real image, i.e., real specular image 5 at a position symmetrical to the object 4 with respect to the dihedral corner reflector array 6. The viewer V cannot see directly the real specular image 5. The viewer V sees a resultant virtual image 5' reflected from the specular image 5 by the reflective screen 8. That is, the viewer V sees the floating image 5' formed behind the reflective screen 8 (formed in a space behind the reflective surface, alternatively formed in the outside of the vehicle when using a windshield 7 instead the reflective screen 8) that is a virtual image of the specular image 5.

Figure 11:
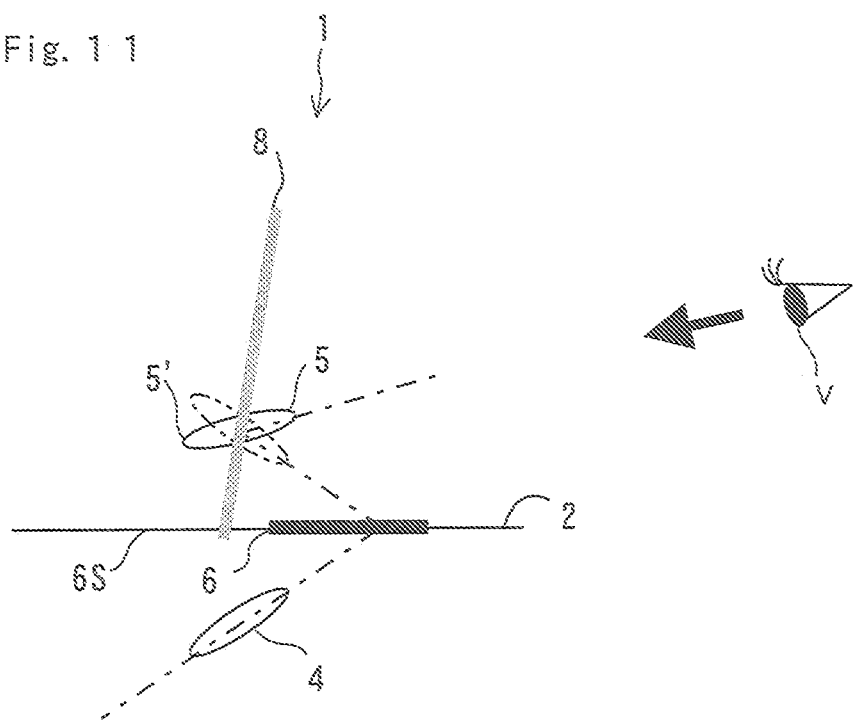

Furthermore, there is described under FIG. 11 the case the distance between the dihedral corner reflector array 6 and the object 4 is nearly equal to that of between the dihedral corner reflector array 6 and the reflective screen 8, so that the real specular image 5 is formed at the reflective screen 8. As shown in FIG. 11, in this case, a viewer sees both the real image 5 of a real specular image and a virtual image 5' formed by the reflective screen 8 since the object 4 has a certain finite size.

Each light beam emitted from the object 4 passes through the dihedral corner reflector array 6 after being reflected twice by the dihedral corner reflector array 6. Then, a real image of the object 4 is formed as a floating image, i.e., specular image at a position symmetrical to the object 4 with respect to the dihedral corner reflector array 6. In the present embodiment, the reflective screen 8 is arranged at nearly the center of the floating image. Accordingly, the viewer V sees part of the object farther from the dihedral corner reflector array 6 as the real image 5, while seeing part of the object closer to the dihedral corner reflector array 6 as the virtual image 5'. That is, if the reflective screen 8 is arranged to cross the real image 5 of the object, the viewer V sees an aerial image sticking in the mirror surface of the reflective screen 8.

As described above, by changing the arrangement of the object 4, the dihedral corner reflector array 6 and the reflective screen 8 in various ways, an aerial image provided to the viewer V is formed in front of or behind the mirror surface of the reflective screen 8, or on the mirror surface of the reflective screen 8 (as an image sticking in the mirror surface).

Figure 12:
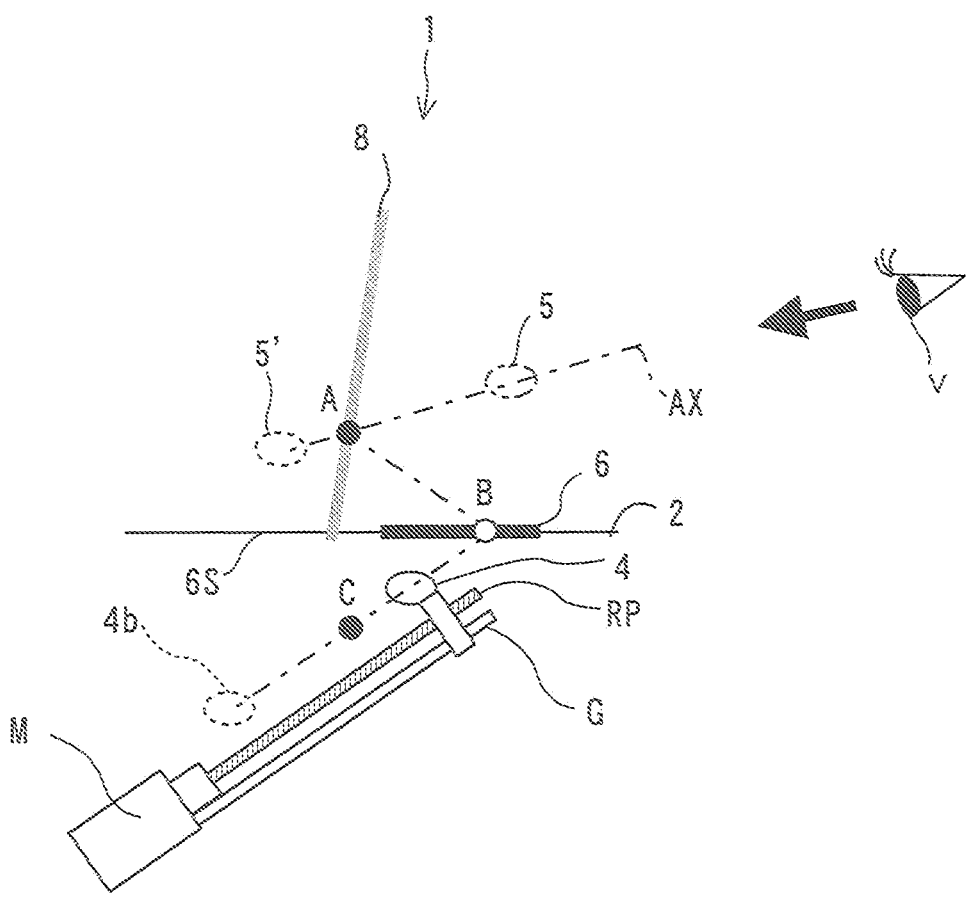

In order to positively take advantage of this feature, a positional relationship there among may be changed with time. FIG. 12 shows a yet another embodiment in which an object of view is mechanically moved along a line connecting the object and an imaging optical system of real specular image by using a guide translation mechanism RP such as a combination of a guide rail, a motor, and a rack-and-pinion or worm-and-nut guide mechanism.

As shown in FIG. 12, an object of view 4 is attached to a sliding part that slidably travels along a guide rail G parallel to an optical axis AX so that an aerial image of the object can be moved along the sightline of a viewer V (along the optical axis AX). The object 4 can be moved linearly by a motor M and the guide translation mechanism RP. As an example, a real image is formed in a space between the reflective screen 8 and the viewer V when an object of view 4b is far from the dihedral corner reflector array 6. In this case, the viewer V sees a real image 5 thereby formed. A real image is formed in a space between the reflective screen 8 and the dihedral corner reflector array 6 when the object 4 is close to the dihedral corner reflector array 6. In this case, the viewer V sees a virtual image 5' formed in the reflective screen 8. Thus, if there is used means for changing a positional relationship among the object of view, the dihedral corner reflector array 6 and the reflective screen 8 with time, then the viewer V is allowed to see an aerial image that is continuously moved between the space behind and the space in front of the mirror surface of the reflective screen 8.

Assuming that, as a criterion, there is a predetermined spatial distance between a certain point A on the reflective screen 8 and another certain point B on an imaging optical system of real specular image 6 (a distance between points A and B shown in FIG. 12) and an optical axis includes a position being plane-symmetrical to the point A on the reflective screen 8 with respect to the element surface 6S (i.e., a position C on the optical axis shown in the FIG. 12), thus the distance A-B is equal to B-C. In this case, there are three situations on the particular optical axis, i.e., first, the distance between the object 4 and the imaging optical system of real specular image 6 is shorter than that of points of A and B and, second, the particular distance is equal to that of points of A and B, and third, the particular distance is longer than that of points of A and B. If a position of the object of view 4 is changed selectively in such a manner that at least two of such three 3 conditions are satisfied, then the driver can perceive a position of an image of an object of view with respect to the reflective screen (windshield) such as in the inside of a vehicle (real image) or in the outside of a vehicle (virtual image) or at the windshield (an image of an object of view united with a real image and a virtual image sticking therethrough) with positional changes. Therefore, in addition to the manner of the continuous changes as shown in FIG. 12, the position of the object of view may be selectively changed in such a manner that there are at least two situations selected from situations consists of where the image to be seen is arranged to cross the reflective screen, where the image to be seen is a virtual image in the reflective screen, and where the image to be seen is a real image out of the reflective screen.

If a plurality of compact light sources (not shown) such as LEDs are arranged in line as objects of view, and are turned on sequentially to control a source of light, a viewer can see similar movement of an aerial image without necessitating actual movement of an object of view itself.

Figure 13:
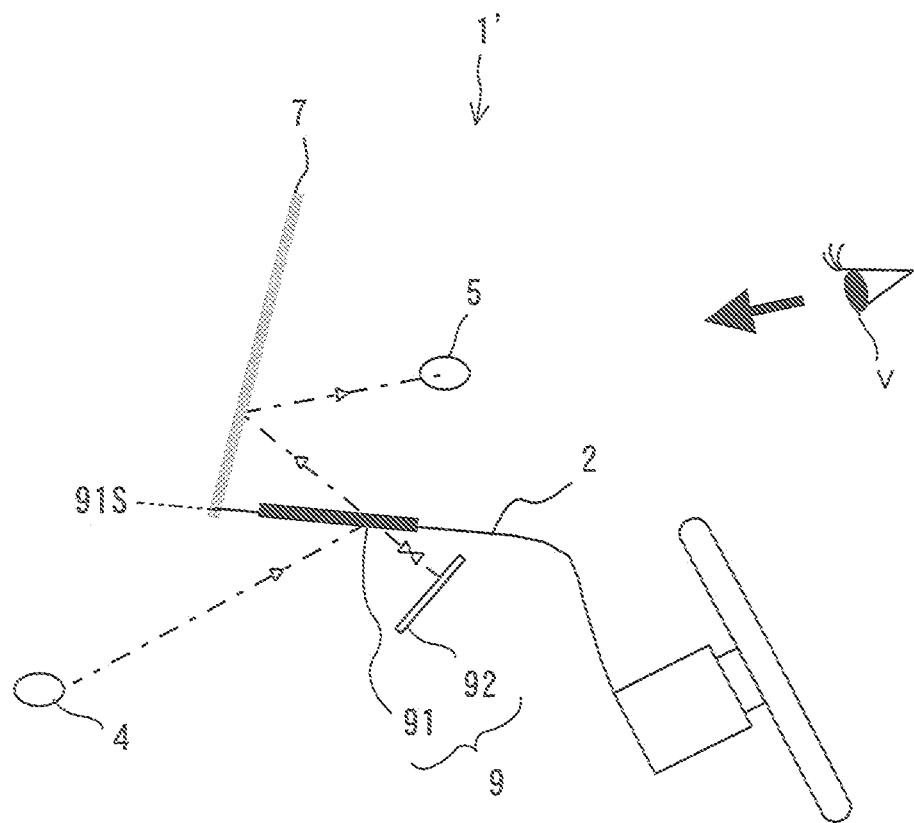
FIG. 13 is a schematic cross-sectional side view illustrating how a light beam is retro-reflected by a retroreflector array and retroreflectors applied to an imaging optical system of real specular image of another embodiment according to the present invention.

FIG. 13 schematically shows a still another embodiment of a head-up display device to which the present invention is applied. A head-up display device 1' differs only in an imaging optical system of real specular image from the head-up display device 1 of the foregoing embodiments. Accordingly, structural elements of the head-up display device 1' same as those of the head-up display device 1 are described with the same names and the same reference numerals adapt.

An imaging optical system of real specular image 9 adapted to the present embodiment is formed by combining a half mirror 91 and a retroreflector array 92. A surface of the half mirror 91 has an element surface 91S functioning as a plane of symmetry. An object of view 4 is arranged in a space opposite to a viewer V (the inside space of a dashboard) with respect to the half mirror 91. The retroreflector array 92 is also arranged in the space opposite to the viewer V. A windshield 7 is arranged on an upper surface of a dashboard (a space in which the viewer V exists). Each light beam emitted from the object 4 is reflected by the half mirror 91, and is then guided to the retroreflector array 92. The retroreflector array 92 has a function to cause retroreflection of each light beam from the half mirror 91. Accordingly, the light beam guided to the retroreflector array 92 returns to the half mirror 91. After passing through the half mirror 91, the light beam travels to the windshield 7 arranged in the space in which the viewer V exists. Next, the light beam is caused to turn back by the windshield 7, so that a real image 5 is formed in a space within the sightline of the viewer V. The angle of the windshield 7 is suitably set so that each light beam from the half mirror 91 can be guided to the viewer V.

The half mirror 91 may also be made by coating one surface of a transparent thin plate made, for example, of transparent resin or glass with a thin reflective film. The opposite surface of the transparent thin plate is subjected to an antireflection process (i.e., AR coating), thereby preventing the real image 5 to be seen from becoming a double image. In addition, an optical film (not shown) with functions such as a visibility control film or a view angle control film may be attached onto the upper surface of the half mirror 91 as sightline control means, in which the visibility control film diffuses only light beams in certain directions and the visible angle control film cuts off only light beams in certain directions but both allow light transmission in other certain directions. Specifically, such an optical film prevents a light beam after directly passing through the half mirror 91 from reaching a place except the viewpoint of the viewer V, so that an image of an object of view reflected in the windshield 7 cannot be seen directly from any place except the viewpoint of the viewer V through the half mirror 91. Whereas, the optical film also allows only a through-passing of light beams traveling in the direction from the retroreflector array 92 through the half mirror 91, after being reflected once by the half mirror 91 and retro-reflected by the retroreflector array 92, as described below, so that only the real image 5 can be seen from the viewpoint of the viewer V.

Figure 14A:
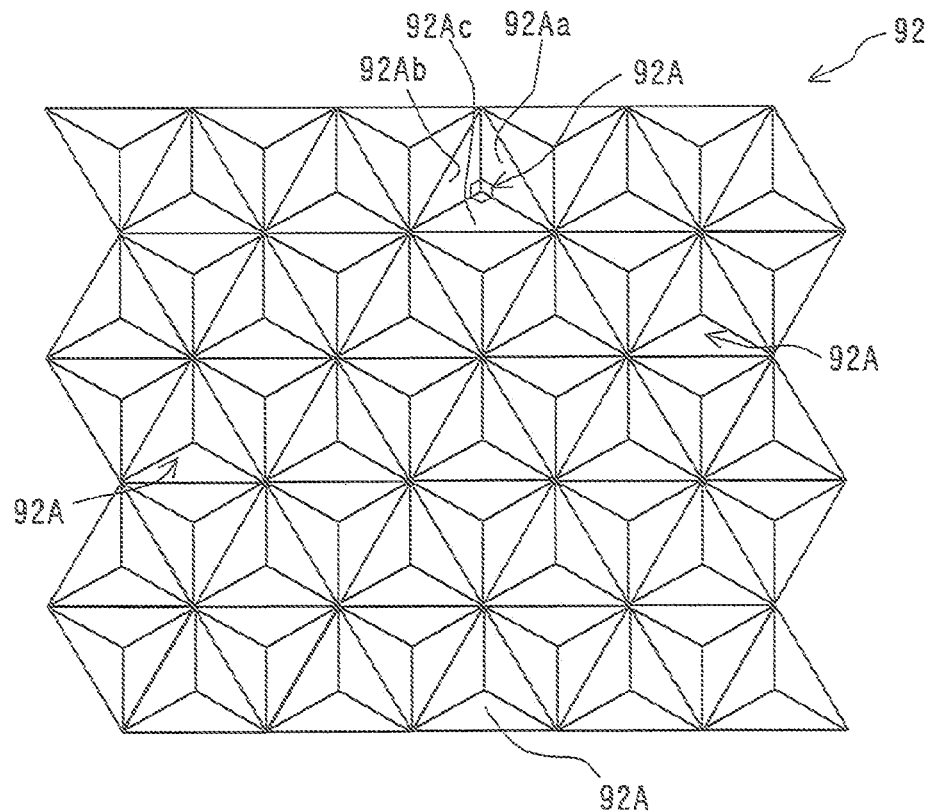
FIG. 14A is a schematic partial plan view illustrating a retroreflector array applied to the imaging optical system of real specular image.
Figure 14B:
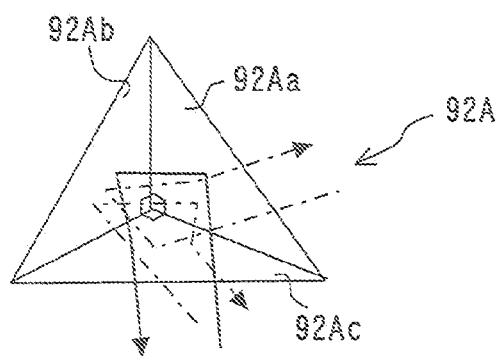
FIG. 14B is a schematic enlarged partial plan view illustrating how a light beam is retro-reflected by an exemplary retroreflector of the retroreflector array shown in FIG. 14A.

Whereas, the retroreflector array 92 may be of any type as long as it strictly causes retroreflection of an incoming light beam. The retroreflector array 92 may be formed by applying a retroreflective material or a retroreflective coating to a material surface. Furthermore, the retroreflector array 92 may have a curved surface, or a flat surface. FIG. 14A is a front view showing part of the retroreflector array 92 in an enlarged manner. The retroreflector array 92 shown in FIG. 14A is a corner cube array as an aggregate of corner cubes each utilizing one of the internal angles of a cube. Retroreflectors 92A is a corner cube array consisting of a regulated set of corner cubes, each of which is obtained as one inner corner of a cube. Each retroreflector 92A is formed by concentrating three mirror surfaces 92Aa, 92Ab and 92Ac, in the shape of identically shaped and sized isosceles right triangles joined at a common point, showing an equilateral triangle shape when seen from the front; with those three mirror surfaces 92Aa, 92Ab and 92Ac are orthogonal to each other to form one common corner cube (FIG. 14B).

Figure 15A:
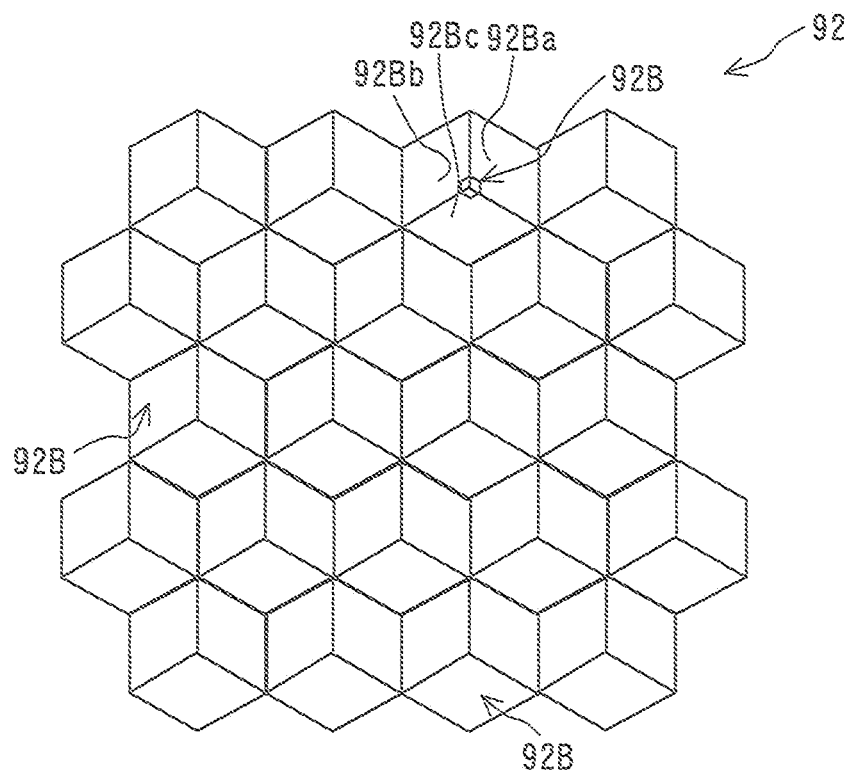
FIG. 15A is a schematic partial plan view illustrating another retroreflector array applied to the imaging optical system of real specular image.
Figure 15B:
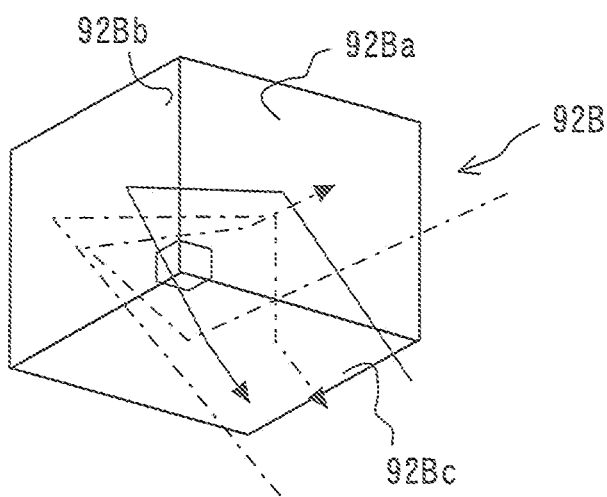
FIG. 15B is a schematic enlarged partial plan view illustrating how a light beam is retro-reflected by an exemplary retroreflector of the retroreflector array shown in FIG. 15A.

FIG. 15A is also a front view showing part of the retroreflector array 92 in an enlarged manner. The retroreflector array 92 shown in FIG. 15A is also a corner cube array as a regulated aggregate of corner cubes each utilizing one of inner corners of a cube. Retroreflectors 92B each have a shape of a equilateral hexagon, when viewed from the front, formed by concentrating three mirror surfaces 92Ba, 92Bb and 92Bc in the form of squares of the same shape and the same size joined at a common point. The three mirror surfaces 92Ba, 92Bb and 92Bc are orthogonal to each other (FIG. 15B).

Although the retroreflector arrays 92 shown in FIGS. 14A and 15A are different in shape, their principles of retroreflection are the same. FIGS. 14B and 15B explain the principles of retroreflection of the retroreflector arrays 92 shown in FIGS. 14A and 15A, respectively. A light beam entering one of the mirror surfaces (92Aa or 92Ba, for example) of the retroreflector 92A or 92B is sequentially reflected by a different mirror surface (92Ab or 92Bb), and by the other mirror surface (92Ac or 92Bc). Accordingly, the light beam is reflected back to a place from which it entered the retroreflector 92A or 92B. A path of a light beam entering the retroreflector array 92 and a path of a light beam exiting the retroreflector array 92 do not overlap, but in a strict sense, parallel to each other. If the retroreflector 92A or 92B is sufficiently small compared to the retroreflector array 92, paths of incident and outgoing light beams may be considered as overlapping each other. These two types of corner cube arrays differ from each other in the following. The corner cube array with mirror surfaces in the form of isosceles triangles is relatively easy to make but is somewhat low in reflectivity, while the corner cube array with mirror surfaces in the form of squares is relatively difficult to make but is high in reflectivity.

An alternative to the aforementioned corner cube arrays may be used as the retroreflector array 92, as long as the alternative (that is called a "corner reflector" in a broad sense) causes retroreflection of a light beam by using three mirror surfaces. While it is not shown here, for instance, an exemplary unit retroreflector to be applied in the embodiments has three mirror surfaces, two of which are orthogonal to each other, and the other is at an angle 90/N (N is an integer) degrees with respect to the other two. Another example of the unit retroreflector is an acute angle retroreflector with three mirror surfaces, where angles defined between adjacent ones of the mirror surfaces are 90, 60 and 45 degrees. A cat's eye retroreflector may also be applied as the unit retroreflector. These retroreflector arrays may be planar, curved, or warped. The location of the retroreflector array may suitably be determined, as long as a light beam emitted from an object of view and reflected by the half mirror 91 is retro-reflected by the retroreflector array.

In the head-up display device 1' having the half mirror 91 and the retroreflector array 92, similarly in the head-up display device 1 having a dihedral corner reflector array, a real image 5 is seen as an image floating in a space within the sightline of a viewer in a direction slanting to the mirror surface of the half mirror 91. The head-up display device 1' can also make variations of the real image 5 by changing the position at which an image to be formed is displayed, or by changing the size of an image to be seen.

The specific structure of each constituent part of the head-up display device may suitably be changed without departing from the purport of the present invention. As an example, the present invention is applied to a head-up display device for making a floating image in a space in front of a display part of the head-up display device.

The present invention is applicable as a display device for advertising purposes, and as an information display device for use in vehicles.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed embodiments but may be practiced within the full scope of the appended claims.

This application is based upon and claims the benefit of priority from the prior Japanese Patent Application No. 2009-222342, filed Sep. 28, 2009, the entire contents of which are incorporated herein by reference.

What is claimed is:

1. A head-up display device placed on an upper surface of a dashboard, comprising:
    an object of view arranged in an inside space of the dashboard;
    an imaging optical system of real specular image for defining a space where a viewer exists and the inside space of the dashboard, the imaging optical system of real specular image including a semitransparent substrate with a plane of symmetry, the imaging optical system of real specular image forming a real image of the object of view in the space of the viewer with light passing through the substrate;
    a reflective screen arranged in the space of the viewer, the reflective screen reflecting light beams of the real image of the object of view supplied from the imaging optical system of real specular image to guide the reflected light beams to the viewer, while allowing formation of an image to be seen by the viewer;
    a mechanism for changing a position of the object of view with respect to the imaging optical system of real specular image; and
    a mechanism for moving the object of view along a line connecting the object of view and the imaging optical system of real specular image, wherein a position of the object of view is changed in such a manner that there are at least two situations selected from situations consists of where the image to be seen is arranged to cross the reflective screen, where the image to be seen is a virtual image in the reflective screen, and where the image to be seen is a real image out of the reflective screen.

2. The head-up display device according to claim 1, wherein the reflective screen is a windshield.

3. The head-up display device according to claim 1, wherein the reflective screen is adhered to a surface of a windshield.

4. The head-up display device according to claim 1, wherein the imaging optical system of real specular image is an optical element functioning as a dihedral corner reflector.

5. The head-up display device according to claim 1, wherein the imaging optical system of real specular image is formed by a combination of a half mirror and a retroreflector array.

6. The head-up display device according to claim 1, wherein the substrate is formed to be a united body with the dashboard.

7. The head-up display device according to claim 1, wherein a surface of the substrate is colored with a same color of the dashboard.

8. A head-up display device placed on an upper surface of a dashboard, comprising:
   an object of view arranged in an inside space of the dashboard;
   an imaging optical system of real specular image for defining a space where a viewer exists and the inside space of the dashboard, the imaging optical system of real specular image including a semitransparent substrate with a plane of symmetry, the imaging optical system of real specular image forming a real image of the object of view in the space of the viewer with light passing through the substrate, wherein the imaging optical system of real specular image is an optical element functioning as a dihedral corner reflector; and
   a reflective screen arranged in the space of the viewer, the reflective screen reflecting light beams of the real image of the object of view supplied from the imaging optical system of real specular image to guide the reflected light beams to the viewer, while allowing formation of an image to be seen by the viewer.

9. The head-up display device according to claim 8, wherein the reflective screen is a windshield.

10. The head-up display device according to claim 8, wherein the reflective screen is adhered to a surface of a windshield.

11. The head-up display device according to claim 8, wherein the substrate is formed to be a united body with the dashboard.

12. The head-up display device according to claim 8, wherein a surface of the substrate is colored with a same color of the dashboard.

13. A head-up display device placed on an upper surface of a dashboard, comprising:
   an object of view arranged in an inside space of the dashboard;
   an imaging optical system of real specular image for defining a space where a viewer exists and the inside space of the dashboard, the imaging optical system of real specular image including a semitransparent substrate with a plane of symmetry, the imaging optical system of real specular image forming a real image of the object of view in the space of the viewer with light passing through the substrate, wherein the imaging optical system of real specular image is formed by a combination of a half mirror and a retroreflector array; and
   a reflective screen arranged in the space of the viewer, the reflective screen reflecting light beams of the real image of the object of view supplied from the imaging optical system of real specular image to guide the reflected light beams to the viewer, while allowing formation of an image to be seen by the viewer.

14. The head-up display device according to claim 13, wherein the reflective screen is a windshield.

15. The head-up display device according to claim 13, wherein the reflective screen is adhered to a surface of a windshield.

16. The head-up display device according to claim 13, wherein the substrate is formed to be a united body with the dashboard.

17. The head-up display device according to claim 13, wherein a surface of the substrate is colored with a same color of the dashboard.

* * * * *